United States

Imai et al.

4,063,802

Dec. 20, 1977

[54] TELEPHOTOGRAPHIC LENS SYSTEM HAVING SHORT TOTAL LENGTH

[75] Inventors: Toshihiro Imai; Yoshitsugi Ikeda, both of Hachiouji, Japan

[73] Assignee: Olympus Optical Co., Ltd., Tokyo, Japan

[21] Appl. No.: 705,173

[22] Filed: July 14, 1976

[30] Foreign Application Priority Data

July 18, 1975 Japan .................... 50-87186

[51] Int. Cl.² .................................. G02B 13/02
[52] U.S. Cl. .................................. 350/223
[58] Field of Search ......................... 350/223

[56] References Cited

U.S. PATENT DOCUMENTS 3,848,972   11/1974   Nakamura .................. 350/223

*Primary Examiner*—Conrad J. Clark
*Attorney, Agent, or Firm*—Cushman, Darby & Cushman

[57] ABSTRACT

A telephotographic lens system short in its total length comprising a first positive meniscus lens component, a second positive meniscus lens component, a third negative meniscus lens component and a fourth positive cemented lens component which are so adopted and arranged as to favorably correct aberrations such as spherical aberration and astigmatism.

5 Claims, 25 Drawing Figures

SPHERICAL ABERRATION

ASTIGMATISM 14°

DISTORTION

COMA

SPHERICAL ABERRATION

ASTIGMATISM

DISTORTION

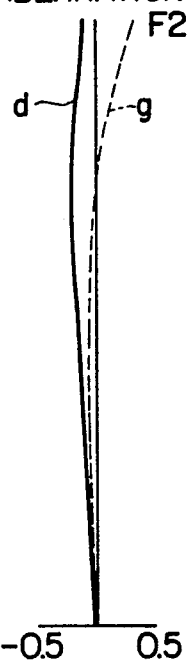
FIG. 4A
SPHERICAL ABERRATION
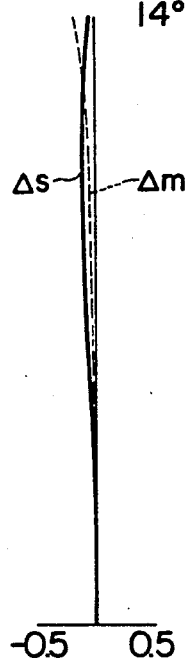
FIG. 4B
ASTIGMATISM 14°
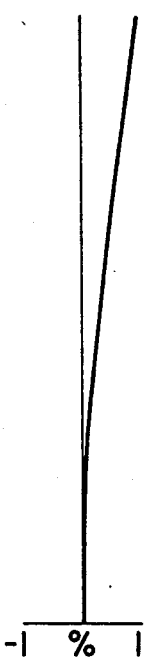
FIG. 4C
DISTORTION
FIG. 4D
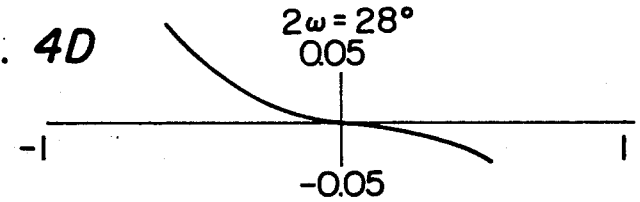
COMA
2ω = 28°
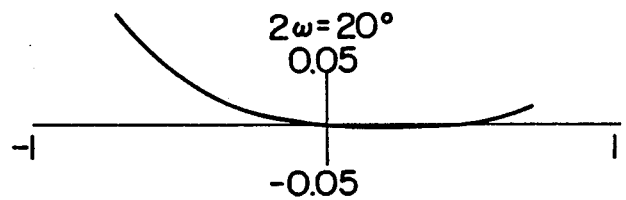
2ω = 20°
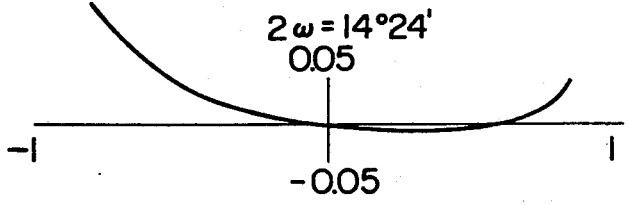
2ω = 14°24'

SPHERICAL ABERRATION

ASTIGMATISM

DISTORTION

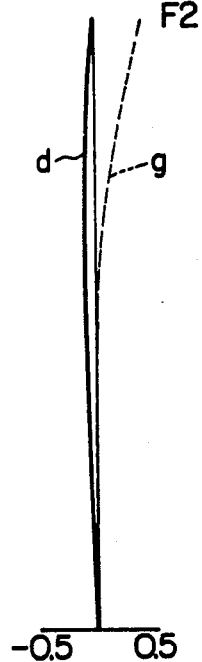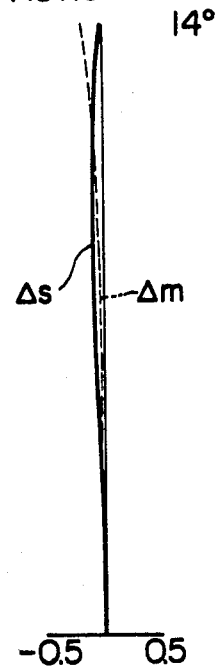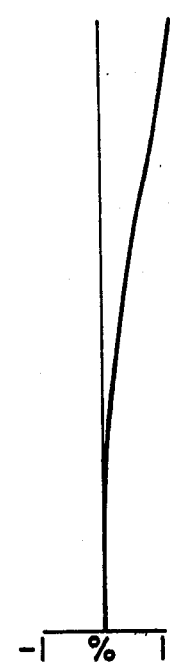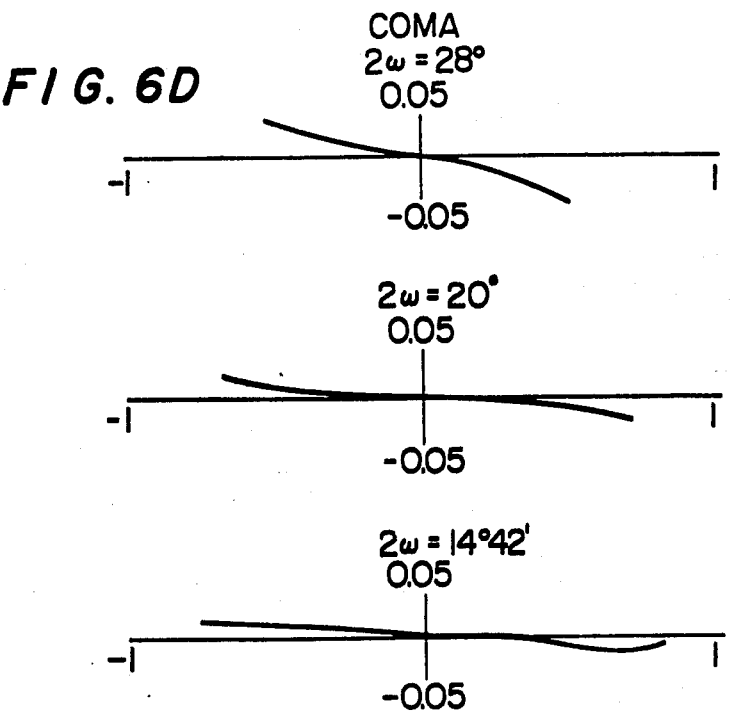

SPHERICAL ABERRATION

ASTIGMATISM 14°

DISTORTION

TELEPHOTOGRAPHIC LENS SYSTEM HAVING SHORT TOTAL LENGTH

BACKGROUND OF THE INVENTION a. Field of the Invention

The present invention relates to a telephotographic lens system having a short total length, a numerical aperture of F/2, a telephoto ratio of 1.07 to 1.08 and wherein spherical aberration and astigmatism are favorably corrected.

b. Description of the Prior Art

Telephotographic lens systems consisting of small number of lens elements and having large aperture ratios as is exemplified by Japanese Patent Publication No. 9466/55 are conventionally known to the public. As can judged from this example, however, conventional telephotographic lens systems are not sufficiently satisfactory in their compactness and other respects.

SUMMARY OF THE INVENTION

It is a general object of the present invention to provide a telephotographic lens system which is composed of a small number of lens elements and especially short in its total length. The telephotographic lens system according to the present invention comprises four components of five lenses: a first positive meniscus lens component, a second positive meniscus lens component, a third negative meniscus lens component and a fourth positive cemented doublet lens component. The telephotographic lens system according to the present invention is so adapted as to satisfy the following conditions:

(1) $0.4f < f_{12} < 0.5f$
(2) $4 < f_{123}/f_{45} < 6$
(3) $0.28f < r_3 < 0.35f$
(4) $0.6f < r_4 < 0.75f$
(5) $1.4f < r_5 < 2f$
(6) $0.18f < r_6 < 0.24f$
(7) $0.98 < |r_6/r_8| < 1.03$
(8) $1.3f < r_7 < 1.8f$
(9) $1.68 < n_1, n_4$
    $1.6 < n_2$
(10) $1.05 < n_4/n_5$
(11) $10 < \nu_5 - \nu_4$
(12) $45 < \nu_1, \nu_2$
    $\nu_3 < 28$ wherein, the reference symbols represent as defined below:

$f$: total focal length of the entire lens system as a whole $f_{12}$: total focal length of the first and second lens components $f_{123}$: total focal length of the first, second and third lens components $f_{45}$: focal length of the fourth lens component $r_1$ through $r_9$: radii of curvature on surfaces of respective lens elements as considered consecutively from the object side $n_1$ through $n_5$: refractive indices of respective lens elements $\nu_1$ through $\nu_5$: Abbe's numbers of respective lens elements While an object of the present invention is to provide a compact telephotographic lens system, compactness of lens systems can be judged by a parameter of telephoto ratio, i.e., ratio of the distance from the first surface of the lens system to the film surface relative to the focal length of the entire lens system. The conditions (1) and (2) above are adopted for limiting the telephoto ratio whithin a range smaller that 1.1. For achieving this purpose, the total focal length $f_{12}$ of the first and second lens components is limited within a range smaller than $0.5f$ ($f_{12} < 0.5f$) and the ratio of the total focal length of the first through the third lens components relative to the focal length of the fourth lens component is selected within a range smaller than 6 ($f_{123}/f_{45} < 6$). That is to say, it is possible to shorten the total length of a lens system and minimize telephoto ratio when backfocal length $f_B$ is shortened by shortening $f_{12}$ for increasing refractive power of the first and second lens components or minimizing $f_{123}/f_{45}$. It is therefore required to select $f_{12}$ and $f_{123}/f_{45}$ below the upper limits of the conditions (1) and (2) respectively. When these values are too small, however, spherical aberration will be undercorrected and, therefore, it is desireable to select them within ranges of $0.4f < f_{12}$ and $4 < f_{123}/f_{45}$ respectively.

The conditions (3), (4) and (5) are necessary to minimize spherical aberration in a lens system compactly designed as described above. Of these conditions, $0.28f < r_4 < 0.75f$ and $1.4f < r_5$ are defined for preventing spherical aberration from being undercorrected, whereas $r_3 < 0.35f$, $0.6f < r_4$ and $r_5 < 2f$ are adopted for preventing spherical aberration from being overcorrected. $r_5 < 2f$ in the condition (5) is effective, in combination with $0.18f < r_6$ in condition (6), for preventing spherical aberration from being overcorrected especially at short wavelengths.

Telephotographic lens systems having focal lengths of 80 mm or so are sometimes used for obtaining soft focus effect by operating them in such a mode that slight symmetrical coma will remain with resolution kept at high levels by selecting a relatively large stop opening. Therefore, telephotographic lens systems are sometimes designed to permit such an operating mode. The conditions described below are necessary for this purpose. Speaking more concretely, the conditions (7) and (8) are effective for improving symmetry of off-axial spherical aberration, i.e., coma especially due to upper rays. In these conditions, $0.98 < |r_6/r_8|$ and $r_7 < 1.8f$ are required for preventing coma due to upper rays from remaining too little, thereby balancing it with residual coma of lower rays. $|r_6/r_8| < 1.03$ and $1.3f < r_7$ in these conditions are, in contrast, necessary for preventing coma due to upper rays from remaining too musch. With regard to lower rays, the condition (6) is effective in combination with the aforementioned condition (4). Speaking more concretely, $r_4 < 0.75f$ and $r_6 < 0.24f$ are effective to prevent coma due to lower rays from remaining too much, whereas $0.6f < r_4$ and $0.18f < r_6$ serve for preventing coma due to lower rays from remaining too little. As is understood from the above description, the telephotographic lens system according to the present invention is so adapted as to keep symmetry of coma so that the lens system is usable in the aforementioned operating mode.

Further, the condition (6) is required, in combination with the condition (3), for favorably correcting astigmatism to a degree similar to spherical aberration.

One of the characteristics of the present invention lies in the fact that it is capable of correcting curvature of field far more favorably than the conventional telephotographic lens systems. A general method for minimizing curvature of field while favorably correcting spherical aberration is to enhance refractive power to positive lens components and reducing refractive power of negative lens components. In the telephotographic lens system according to the present invention, curvature of field is therefore favorably corrected by selecting refractive indices within the ranges defined by the condition (9) for the first and second lens components and the object side element of the fourth lens component.

The conditions (10), (11) and (12) are defined for favorably correcting chromatic aberration. The condition (12) is adopted for minimizing chromatic aberration produced by the first and second positive lens components and correcting chromatic aberration produced by the third negative lens component. For this purpose, the condition (12) limits Abbe's numbers of the first and second lens components about 45 ($45 < \nu_1, \nu_2$), and Abbe's number of the third lens component below 28 ($\nu_3 < 28$). Since longitudinal and lateral chromatic aberrations are corrected by the fourth cemented lens component, refractive indices and Abbe's numbers of the two lens elements of the fourth lens components are limited within the ranges defined by the conditions (10) and (11). These conditions are effective for preventing spherical aberration from being overcorrected for rays having short wavelengths, minimizing variation of lateral chromatic aberration depending on image height and reducing absolute quantity of lateral chromatic aberration. Therefore, chromatic aberration is favorably corrected in the telephotographic lens system according to the present invention.

In lens systems which are so designed as to favorably correct aberrations for photographing objects at infinite distance, however, aberrations are generally aggravated, especially symmetry of off-axial spherical aberration is degraded and astigmatism is aggravated when the lens systems are focused on objects at short distance. For eliminating such a shortcoming, the lens system according to the present invention is so adapted as to permits correcting aberrations by displacing a lens component alone for correcting aberrations in photographing object at short distance. In such a case, however, it is necessary to prevent spherical aberration from being aggravated by displacing a certain lens component alone. In the lens system according to the present invention, it is possible to favorably correct aforementioned astigmatism and other aberrations by displacing the fourth lens component alone while keeping the total focal length of the first through the third lens components within the range defined by the condition (2).

BRIEF DESCRIPTION OF THE DRAWINGS

FIG. 4A through FIG. 4D show curves illustrating uncorrected aberration characteristics of the Embodiment 2 when it is focused on an object at a short distance;

FIG. 6A through FIG. 6D show curves illustrating the aberration characteristics of the Embodiment 3.

DETAILED DESCRIPTION OF THE PREFERRED EMBODIMENTS

Figure 1:
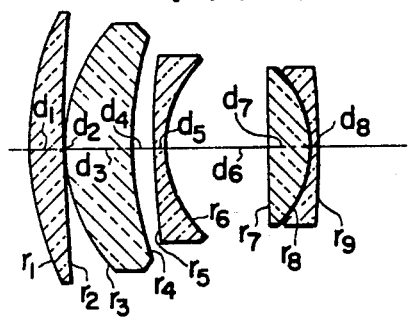
FIG. 1 shows a sectional view illustrating the composition of the telephotographic lens according to the present invention.

Now, some preferred embodiments of the telephotographic lens system according to the present invention will be described below:

Embodiment 1

$r_1 = 59.514$
  $d_1 = 7.34$     $n_1 = 1.72$       $\nu_1 = 50.25$
$r_2 = 387.226$
  $d_2 = 0.18$
$r_3 = 31.522$
  $d_3 = 12.26$    $n_2 = 1.623$      $\nu_2 = 58.14$
$r_4 = 64.950$
  $d_4 = 4.10$
$r_5 = 145.777$
  $d_5 = 1.65$     $n_3 = 1.7847$     $\nu_3 = 25.71$
$r_6 = 21.474$
  $d_6 = 20.05$
$r_7 = 174.254$
  $d_7 = 8.94$     $n_4 = 1.7$        $\nu_4 = 48.08$
$r_8 = -21.424$
  $d_8 = 1.06$     $n_5 = 1.583$      $\nu_5 = 59.36$
$r_9 = -163.873$
$f = 100$, f/2.04, $f_B = 51.807$
telephoto ratio 1.07, $f_{12} = 45.317$
$f_{123} = 323.67$, $f_{45} = 78.016$ Embodiment 2

$r_1 = 56.866$
  $d_1 = 7.06$     $n_1 = 1.7130$     $\nu_1 = 53.89$
$r_2 = 349.169$
  $d_2 = 0.18$
$r_3 = 33.558$
  $d_3 = 12.95$    $n_2 = 1.6223$     $\nu_2 = 53.2$
$r_4 = 70.226$
  $d_4 = 4.47$
$r_5 = 191.985$
  $d_5 = 1.65$     $n_3 = 1.7847$     $\nu_3 = 25.71$
$r_6 = 21.729$
  $d_6 = 20.03$
$r_7 = 163.428$
  $d_7 = 8.95$     $n_4 = 1.6970$     $\nu_4 = 48.51$
$r_8 = -21.961$
  $d_8 = 1.41$     $n_5 = 1.5638$     $\nu_5 = 60.81$
$r_9 = -153.357$
$f = 100$, F/2, $f_B = 51.725$
telephoto ratio 1.084, $f_{12} = 45.962$
$f_{123} = 389.11$, $f_{45} = 72.716$ Embodiment 3

$r_1 = 58.808$
  $d_1 = 7.06$     $n_1 = 1.713$      $\nu_1 = 53.89$
$r_2 = 347.658$
  $d_2 = 0.18$
$r_3 = 33.409$
  $d_3 = 14.12$    $n_2 = 1.61375$    $\nu_2 = 56.36$
$r_4 = 68.560$
  $d_4 = 4.12$
$r_5 = 176.717$
  $d_5 = 1.65$     $n_3 = 1.78472$    $\nu_3 = 25.71$
$r_6 = 22.088$
  $d_6 = 19.44$
$r_7 = 133.521$
  $d_7 = 9.18$     $n_4 = 1.717$      $\nu_4 = 47.94$
$r_8 = -21.689$
  $d_8 = 1.76$     $n_5 = 1.60729$    $\nu_5 = 59.38$
$r_9 = -180.560$
$f = 100$, F/2.04, $f_B = 50.29$
telephoto ratio 1.078, $f_{12} = 47.019$
$f_{123} = 355.786$, $f_{45} = 74.008$ Embodiment 4

$r_1 = 58.654$
  $d_1 = 7.06$     $n_1 = 1.72$       $\nu_1 = 50.25$
$r_2 = 334.719$
  $d_2 = 0.18$
$r_3 = 30.792$
  $d_3 = 12.24$    $n_2 = 1.61375$    $\nu_2 = 56.36$
$r_4 = 69.607$
  $d_4 = 4.12$
$r_5 = 142.687$

Embodiment 4-continued

|  |  |  |
|---|---|---|
| $d_5 = 1.65$ | $n_3 = 1.78472$ | $\nu_3 = 25.71$ |
| $r_6 = 20.601$ | | |
| $d_6 = 20.02$ | | |
| $r_7 = 172.146$ | | |
| $d_7 = 8.94$ | $n_4 = 1.7$ | $\nu_4 = 48.08$ |
| $r_8 = -20.589$ | | |
| $d_8 = 1.65$ | $n_5 = 1.58313$ | $\nu_5 = 59.36$ |
| $r_9 = -165.147$ | | |
| $f = 100$, F/2.04, $f_B = 51.34$ | | |
| telephoto ratio 1.072, $f_{12} = 44.024$ | | |
| $f_{123} = 333.635$, $f_{45} = 76.679$ | | | wherein, the reference symbols $r_1$ through $r_9$ represent radii of curvature on surfaces of the respective lens elements, the reference symbols $d_1$ through $d_8$ denote the thicknesses of respective lens elements and airspaces therebetween, the reference symbols $n_1$ through $n_5$ designate refractive indices of respective lens elements and the reference symbols $\nu_1$ through $\nu_5$ represent Abbe's numbers of the respective lens elements.

As is easily understood from the Embodiments described above, the telephotographic lens system according to the present invention has a telephoto ratio within a range of 1.072 to 1.084 and is designed very compactly.

The compactness of the lens system according to the present invention will be further clarified by comparing its telephoto ratio with those (1.2 or higher) of the conventional lens systems of the similar types (the lens system disclosed by Japanese Patent Publication No. 9466/55 had a telephoto ratio of 1.2). The above-described Embodiments had Petzval's sums listed below:

Embodiment 1 : 0.140
Embodiment 2 : 0.130
Embodiment 3 : 0.135
Embodiment 4 : 0.124

When the above-listed values are compared with the Petzval's sum of 0.292 obtained in the lens system disclosed by Japanese Patent Publication No. 9466/55, it will also be understood that curvature of field is corrected far more favorably in the lens system according to the present invention.

Figure 3A:
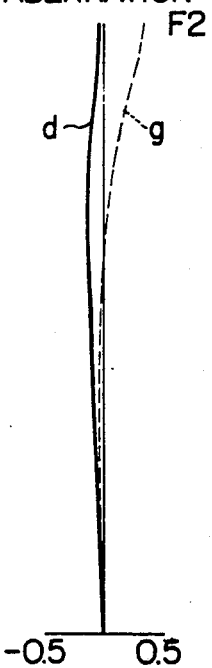
FIG. 3A through FIG. 3D show curves illustrating the aberration characteristics of the Embodiment 2.
Figure 3B:
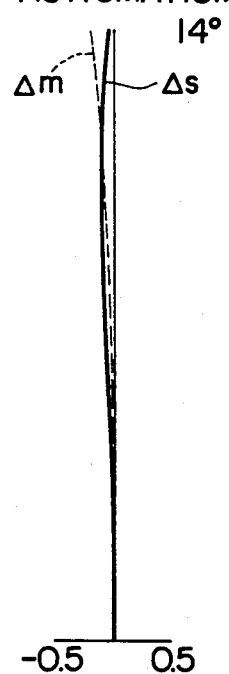
Figure 3C:
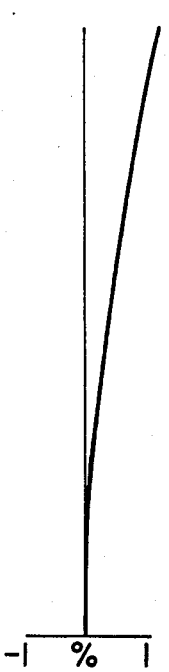
Figure 3D:
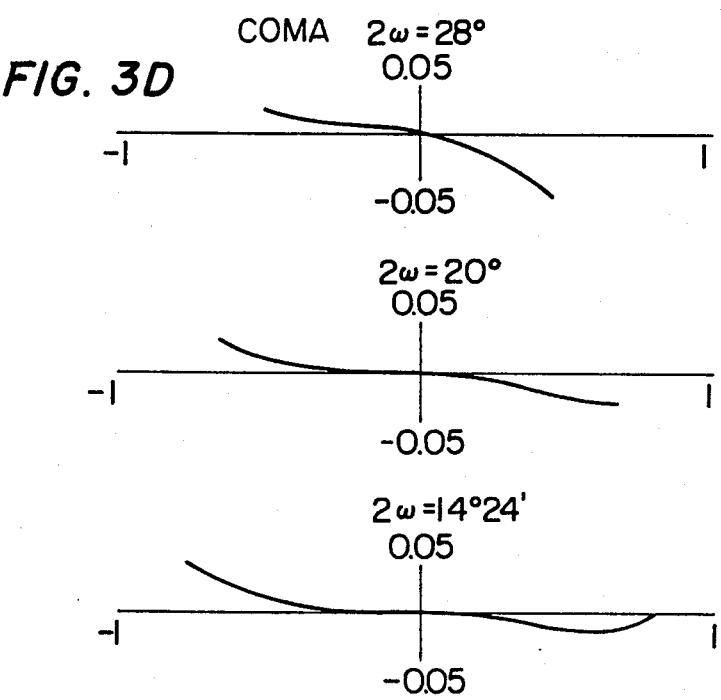
Figure 5A:
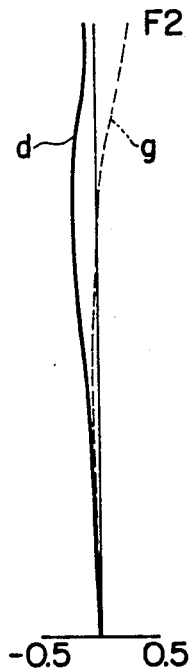
FIG. 5A through FIG. 5D show curves illustrating corrected aberration characteristics of the Embodiment 2 when it is focused on an object at a short distance.
Figure 5B:
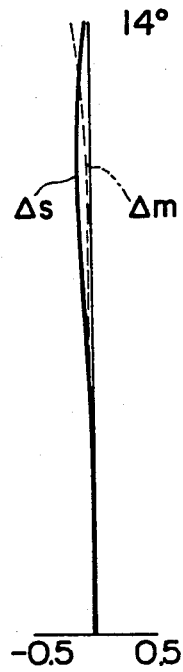
Figure 5C:
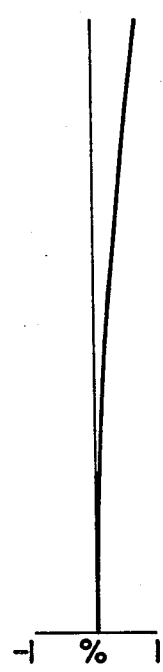
Figure 5D:
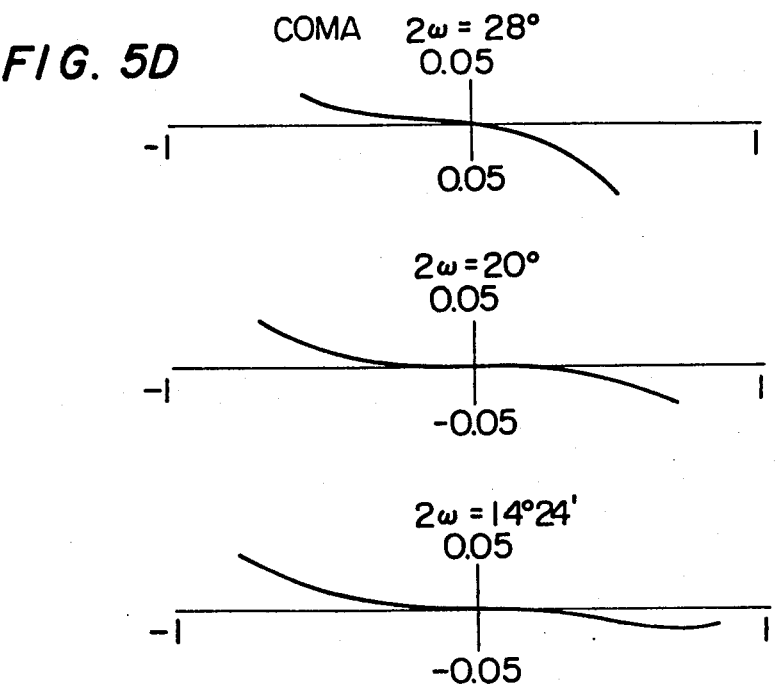

The Embodiment 4 is so designed as to permit displacing the fourth lens component alone for favorably correcting various aberrations in photographing an object at short distance. When this lens system is set for a magnification of 1/20×, the airspace $d_6$ is adjusted to 20.65. The aberration characteristics of the Embodiment 2 when it is focused on an object at infinite distance are illustrated in FIGS. 3A through 3D, those of the Embodiment 2 when it is set for a magnification of 1/20× are shown in FIG. 4A through 4D and those of the Embodiment 2 when it is set for a magnification of 1/20× and the fourth lens component alone is displaced for correcting aberrations are illustrated in FIG. 5A through 5D. As is easily understood from the curves shown in these figures, it is possible to favorably correct aberrations, especially astigmatism and asymmetry of coma, in the lens system according to the present invention even when it is set for photographing an object at short distances.

Figure 2A:
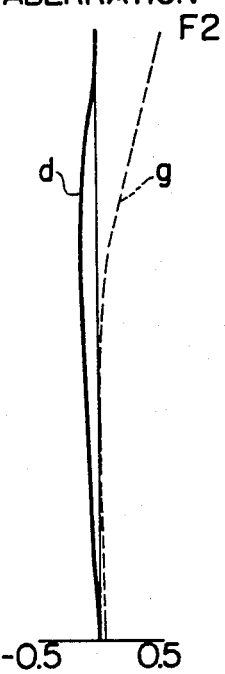
FIG. 2A through FIG. 2D show curves illustrating the aberration characteristics of the Embodiment 1.
Figure 2B:
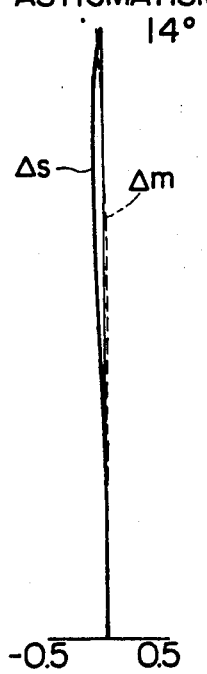
Figure 2C:
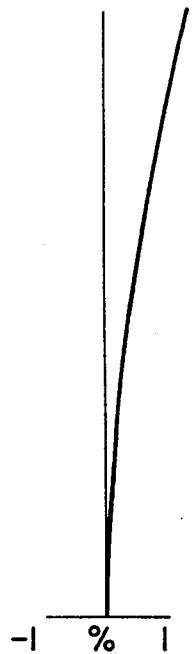
Figure 2D:
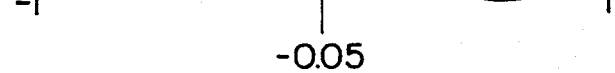
Figure 7A:
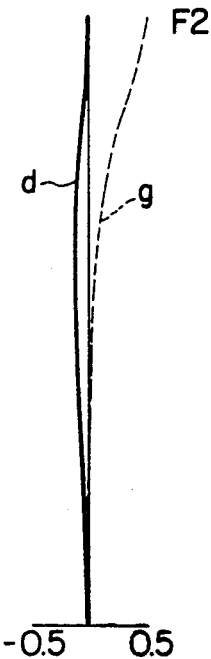
FIG. 7A through FIG. 7D show curves illustrating the aberration characteristics of the Embodiment 4.
Figure 7B:
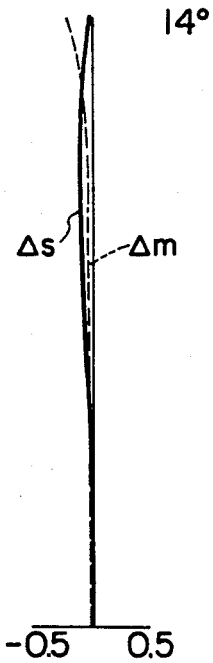
Figure 7C:
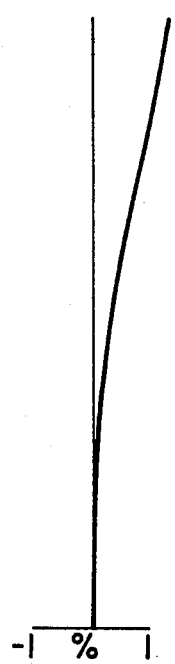
Figure 7D:
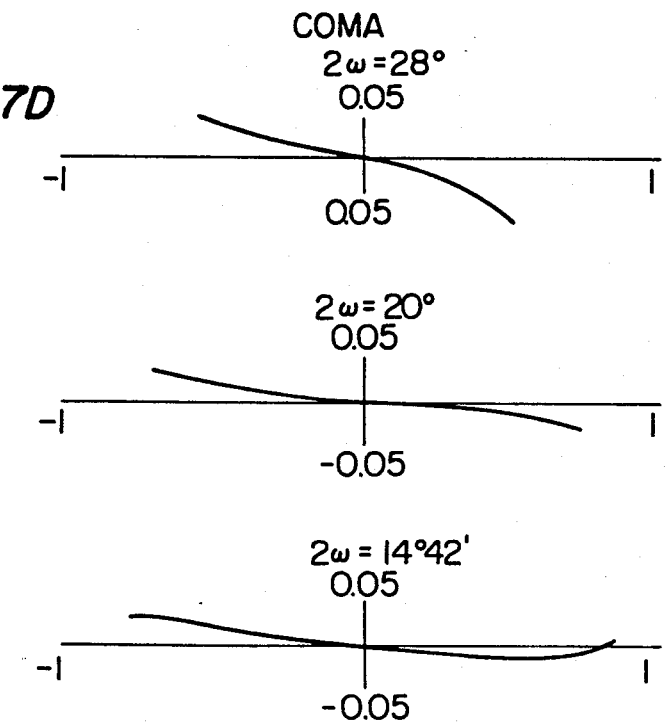

The aberration characteristic of the Embodiments 1, 3 and 4 are illustrated in FIG. 2A through 2D, FIG. 6A through FIG. 6D and FIG. 7A through FIG. 7D respectively.

We claim:

1. A telephotographic lens system comprising a first positive meniscus lens component, a second positive meniscus lens component, a third negative meniscus lens component and a fourth positive cemented lens component, and said lens system satisfying the following conditions:

(1) $0.4f < f_{12} < 0.5f$
(2) $4 < f_{123}/f_{45} < 6$
(3) $0.28f < r_3 < 0.35f$
(4) $0.6f < r_4 < 0.75f$
(5) $1.4f < r_5 < 2f$
(6) $0.18f < r_6 < 0.24f$
(7) $0.98 < |r_6/r_8| < 1.03$
(8) $1.3f < r_7 < 1.8f$
(9) $1.68 < n_1, n_4$
   $1.6 < n_2$
(10) $1.05 < n_4/n_5$
(11) $10 < \nu_5 - \nu_4$
(12) $45 < \nu_1, \nu_2$
   $\nu_3 < 28$ wherein the reference symbol $f$ represent the focal length of the entire lens system, the reference symbol $f_{12}$ designates the total focal length of the first and second lens components, the reference symbol $f_{123}$ denotes the total focal length of the first through the third lens components, the reference symbol $f_{45}$ represents the focal length of the fourth lens component, the reference symbols $r_3$ through $r_8$ designate radii of curvature on the surfaces of the second and third lens components as well as object side surface and cemented surface of the fourth lens component, the reference symbols $n_1$, $n_2$, $n_4$ and $n_5$ denote refractive indices of the first and second lens components as well as the two lens elements of the fourth lens component, and the reference symbols $\nu_1$ through $\nu_5$ represent Abbe's numbers of respective lens elements.

2. A telephotographic lens system according to claim 1, in which said lens system has the following numerical data:

| | | |
|---|---|---|
| $r_1 = 59.514$ | | |
| $d_1 = 7.34$ | $n_1 = 1.72$ | $\nu_1 = 50.25$ |
| $r_2 = 387.226$ | | |
| $d_2 = 0.18$ | | |
| $r_3 = 31.522$ | | |
| $d_3 = 12.26$ | $n_2 = 1.623$ | $\nu_2 = 58.14$ |
| $r_4 = 64.950$ | | |
| $d_4 = 4.10$ | | |
| $r_5 = 145.777$ | | |
| $d_5 = 1.65$ | $n_3 = 1.7847$ | $\nu_3 = 25.71$ |
| $r_6 = 21.474$ | | |
| $d_6 = 20.05$ | | |
| $r_7 = 174.254$ | | |
| $d_7 = 8.94$ | $n_4 = 1.7$ | $\nu_4 = 48.08$ |
| $r_8 = -21.424$ | | |
| $d_8 = 1.06$ | $n_5 = 1.583$ | $\nu_5 = 59.36$ |
| $r_9 = -163.873$ | | |
| $f = 100$, F/2.04, $f_B = 51.807$ | | |
| telephoto ratio 1.07, $f_{12} = 45.317$ | | |
| $f_{123} = 323.67$, $f_{45} = 78.016$ | | | wherein the reference symbols $r_1$ through $r_9$ represent radii of curvature on surfaces of the respective lens elements, the reference symbols $d_1$ through $d_8$ denote the thicknesses of respective lens elements and airspaces therebetween, the reference symbols $n_1$ through $n_5$ designate refractive indices of respective lens elements, the reference symbols $\nu_1$ through $\nu_5$ represent Abbe's numbers of the respective lens elements, the reference symbol $f$ represents the focal length of the entire lens system, the reference symbol $f_B$ represents the back focal length, the reference symbol $f_{12}$ designates the total focal length of the first and second lens components, the reference symbol $f_{123}$ denotes the total focal length of the first through the third lens components, and the reference symbol $f_{45}$ represents the focal length of the fourth lens component.

3. A telephotographic lens system according to claim 1, in which said lens system has the following numerical data:

| | | | |
|---|---|---|---|
| $r_1 = 56.866$ | | | |
| | $d_1 = 7.06$ | $n_1 = 1.7130$ | $\nu_1 = 53.89$ |
| $r_2 = 349.169$ | | | |
| | $d_2 = 0.18$ | | |
| $r_3 = 33.558$ | | | |
| | $d_3 = 12.95$ | $n_2 = 1.6223$ | $\nu_2 = 53.2$ |
| $r_4 = 70.226$ | | | |
| | $d_4 = 4.47$ | | |
| $r_5 = 191.985$ | | | |
| | $d_5 = 1.65$ | $n_3 = 1.7847$ | $\nu_3 = 25.71$ |
| $r_6 = 21.729$ | | | |
| | $d_6 = 20.03$ | | |
| $r_7 = 163.428$ | | | |
| | $d_7 = 8.95$ | $n_4 = 1.6970$ | $\nu_4 = 48.51$ |
| $r_8 = -21.961$ | | | |
| | $d_8 = 1.41$ | $n_5 = 1.5638$ | $\nu_5 = 60.81$ |
| $r_9 = -153.357$ | | | |
| $f = 100$, F/2, $f_B = 51.725$ | | | |
| telephoto ratio 1.084, $f_{12} = 45.962$ | | | |
| $f_{123} = 389.11$, $f_{45} = 72.716$ | | | | wherein the reference symbols $r_1$ through $r_9$ represent radii of curvature on surfaces of the respective lens elements, the reference symbols $d_1$ through $d_8$ denote the thicknesses of respective lens elements and airspaces therebetween, the reference symbols $n_1$ through $n_5$ designate refractive indices of respective lens elements, the reference symbols $\nu_1$ through $\nu_5$ represent Abbe's numbers of the respective lens elements, the reference symbol $f$ represents the focal length of the entire lens system, the reference symbol $f_B$ represents the back focal length, the reference symbol $f_{12}$ designates the total focal length of the first and second lens components, the reference symbol $f_{123}$ denotes the total focal length of the first through the third lens components, and the reference symbol $f_{45}$ represents the focal length of the fourth lens component.

4. A telephotographic lens system according to claim 1, in which said lens system has the following numerical data:

| | | | |
|---|---|---|---|
| $r_1 = 58.808$ | | | |
| | $d_1 = 7.06$ | $n_1 = 1.713$ | $\nu_1 = 53.89$ |
| $r_2 = 347.658$ | | | |
| | $d_2 = 0.18$ | | |
| $r_3 = 33.409$ | | | |
| | $d_3 = 14.12$ | $n_2 = 1.61375$ | $\nu_2 = 56.36$ |
| $r_4 = 68.560$ | | | |
| | $d_4 = 4.12$ | | |
| $r_5 = 176.717$ | | | |
| | $d_5 = 1.65$ | $n_3 = 1.78472$ | $\nu_3 = 25.71$ |
| $r_6 = 22.088$ | | | |
| | $d_6 = 19.44$ | | |
| $r_7 = 133.521$ | | | |
| | $d_7 = 9.18$ | $n_4 = 1.717$ | $\nu_4 = 47.94$ |
| $r_8 = -21.689$ | | | |
| | $d_8 = 1.76$ | $n_5 = 1.60729$ | $\nu_5 = 59.38$ |
| $r_9 = -180.560$ | | | |
| $f = 100$, F/2.04, $f_B = 50.29$ | | | |
| telephoto ratio 1.078, $f_{12} = 47.019$ | | | |
| $f_{123} = 355.786$, $f_{45} = 74.008$ | | | | wherein the reference symbols $r_1$ through $r_9$ represent radii of curvature on surfaces of the respective lens elements, the reference symbols $d_1$ through $d_8$ denote the thicknesses of respective lens elements and airspaces therebetween, the reference symbols $n_1$ through $n_5$ designate refractive indices of respective lens elements, the reference symbols $\nu_1$ through $\nu_5$ represent Abbe's numbers of the respective lens elements, the reference symbol $f$ represents the focal length of the entire lens system, the reference symbol $f_B$ represents the back focal length, the reference symbol $f_{12}$ designates the total focal length of the first and second lens components, the reference symbol $f_{123}$ denotes the total focal length of the first through the third lens components, and the reference symbol $f_{45}$ represents the focal length of the fourth lens component.

5. A telephotographic lens system according to claim 1, in which said lens system has the following numerical data:

| | | | |
|---|---|---|---|
| $r_1 = 58.654$ | | | |
| | $d_1 = 7.06$ | $n_1 = 1.72$ | $\nu_1 = 50.25$ |
| $r_2 = 334.719$ | | | |
| | $d_2 = 0.18$ | | |
| $r_3 = 30.792$ | | | |
| | $d_3 = 12.24$ | $n_2 = 1.61375$ | $\nu_2 = 56.36$ |
| $r_4 = 69.607$ | | | |
| | $d_4 = 4.12$ | | |
| $r_5 = 142.687$ | | | |
| | $d_5 = 1.65$ | $n_3 = 1.78472$ | $\nu_3 = 25.71$ |
| $r_6 = 20.601$ | | | |
| | $d_6 = 20.02$ | | |
| $r_7 = 172.146$ | | | |
| | $d_7 = 8.94$ | $n_4 = 1.7$ | $\nu_4 = 48.08$ |
| $r_8 = -20.589$ | | | |
| | $d_8 = 1.65$ | $n_5 = 1.58313$ | $\nu_5 = 59.36$ |
| $r_9 = -165.147$ | | | |
| $f = 100$, F/2.04, $f_B = 51.34$ | | | |
| telephoto ratio 1.072, $f_{12} = 44.024$ | | | |
| $f_{123} = 333.635$, $f_{45} = 76.679$ | | | | wherein the reference symbols $r_1$ through $r_9$ represent radii of curvature on surfaces of the respective lens elements, the reference symbols $d_1$ through $d_8$ denote the thicknesses of respective lens elements and airspaces therebetween, the reference symbols $n_1$ through $n_5$ designate refractive indices of respective lens elements, the reference symbols $\nu_1$ through $\nu_5$ represent Abbe's numbers of the respective lens elements, the reference symbol $f$ represents the focal length of the entire lens system, the reference symbol $f_B$ represents the back focal length, the reference symbol $f_{12}$ designated the total focal length of the first and second lens components, the reference symbol $f_{123}$ denotes the total focal length of the first through the third lens components, and the reference symbol $f_{45}$ represents the focal length of the fourth lens component.

* * * * *